United States Patent [19]
Fujii et al.

[11] Patent Number: 5,833,432
[45] Date of Patent: Nov. 10, 1998

[54] METHOD FOR LOADING VEHICLE BODY WITH SEATS AND ROBOT HAND FOR CLAMPING SEAT

[75] Inventors: Kanji Fujii; Hideki Fujiwara, both of Hiroshima-ken, Japan

[73] Assignee: Mazda Motor Corporation, Hiroshima-ken, Japan

[21] Appl. No.: 796,495

[22] Filed: Feb. 6, 1997

Related U.S. Application Data

[63] Continuation of Ser. No. 228,017, Apr. 15, 1994, abandoned.

[30] Foreign Application Priority Data

Apr. 15, 1993 [JP] Japan ................................. 5-088449
Feb. 25, 1994 [JP] Japan ................................. 6-052696

[51] Int. Cl.$^6$ ........................................................ B66C 23/00
[52] U.S. Cl. ........................ 414/732; 414/731; 414/786; 294/86.4
[58] Field of Search ............................... 414/729, 730, 414/731, 732, 736, 739, 921, 786, 744.2, 744.3; 901/7, 31, 35, 39; 29/429, 430; 294/106, 119.1, 86.4

[56] References Cited

U.S. PATENT DOCUMENTS

| 4,589,184 | 5/1986 | Asano et al. ............................ 901/7 X |
| 4,629,385 | 12/1986 | Irie ...................................... 414/753 X |
| 4,797,059 | 1/1989 | Karg et al. ........................... 414/739 X |

FOREIGN PATENT DOCUMENTS 62-218289   9/1987   Japan .
4-69174     3/1992   Japan .......................................... 901/7

Primary Examiner—Donald W. Underwood
Attorney, Agent, or Firm—Morrison & Foerster LLP

[57] ABSTRACT

The robot hand has a holding unit with front and rear clamp claws and the holding unit can be inserted into a gap formed between the seat back and the seat cushion from the side of a front space existing ahead of the seat back and over the seat cushion. After the holding unit is inserted into the gap therebetween, the cylinder disposed in the holding unit is elongated to allow each of the clamp claws to assume its upright position, thereby holding the seat in three positions, i.e. at the bottom portion and the lower front and rear portions of the seat back.

20 Claims, 10 Drawing Sheets

METHOD FOR LOADING VEHICLE BODY WITH SEATS AND ROBOT HAND FOR CLAMPING SEAT

This application is a continuation of U.S. application Ser. No. 08/228,017, filed Apr. 15, 1994, now abandoned.

BACKGROUND OF THE INVENTION

1. Field of the Invention

The present invention relates to a method for loading a vehicle body with a vehicle seat and a robot hand for clamping the vehicle seat.

2. Description of the Related Art

Figure 12:
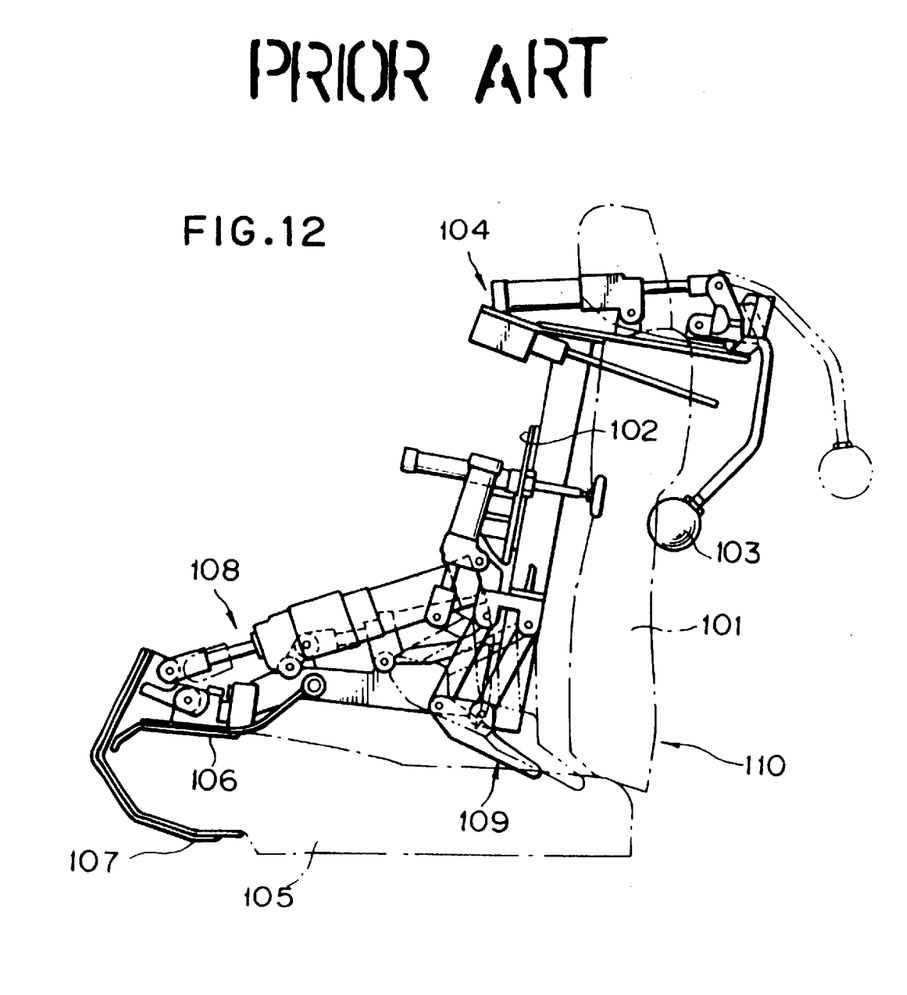
FIG. 12 is a side view showing a conventional apparatus for loading vehicle seats.

A robot hand for clamping a vehicle seat is disclosed, for example, in Japanese Patent Unexamined Publication Kokai No. 62-218,289. As shown in FIG. 12, the robot hand has a piston rod 102 and a clamp arm 103, the piston rod 102 being structured to abut with the upper front surface of a seat back 101 for clamping the upper front portion thereof and the clamp arm 103 being structured to abut with the upper rear surface of the seat back 101 for clamping the upper rear portion thereof. The robot hand is provided with a seat back holding system 104 which in turn is structured to press and hold the seat back 101 at its abutment sites. The clamp arm 103 is disposed to press the rear surface of the seat back 101 in such a way that it turns around an upper portion of the seat back 101 into its rear portion.

The robot hand is further provided with a seat cushion clamping system 108 for clamping a front portion of a seat cushion 105. The seat cushion clamping system 108 comprises a clamp lever 106 for pressing a front upper portion of the seat cushion 105 and a clamp arm 107 abutting with a front lower portion thereof.

In addition, the robot hand has a supporting system 109 for supporting a bottom portion of the seat back 101. The supporting system 109 is so structured as capable of turning into a gap formed between the main bodies of the seat back 101 and the seat cushion 105.

The arrangement of the robot hand allows the supporting system 109 to carry the vehicle seat into the cabin of the vehicle body while tightly clamping the vehicle seat and to be evacuated readily from the cabin thereof after the vehicle seat has been loaded in the cabin thereof.

The robot hand disclosed in the prior patent publication is structured such that it turns about the upper portion of the seat back 101 into its rear portion and it presses and supports the rear surface of the seat back 101. This arrangement, however, suffers from the disadvantage that its usage is restricted to specific models of vehicles because it is difficult to remove or evacuate the clamp arm 103 from the cabin of the vehicle body, particularly to a vehicle body with a low roof.

The robot hand is further encountered with the difficulty in removing the clamp arm 107 from the cabin of the vehicle body, if there would be no big space in front of the seat cushion 105, because it is so structured as to clamp the seat cushion 105 from its front portion.

SUMMARY OF THE INVENTION

The present invention has the object to provide a method for loading a vehicle body with a vehicle seat so adapted as to have a loading system removed or evacuated readily from a cabin of the vehicle body after the vehicle seat has been loaded in the cabin thereof, even if the vehicle body is of a model of a type in which its roof is low or which has no wide space in front of its seat cushion. The present invention has another object to provide a robot hand for clamping the vehicle seat with certainty.

In order to achieve the object as described hereinabove, the present invention consists of a method for loading a cabin of a vehicle body with a vehicle seat comprising a seat back and a seat cushion, by clamping the vehicle seat with a robot hand, wherein the vehicle body is loaded with the vehicle seat through the robot hand by inserting a holding means disposed in the robot hand into a gap formed between the seat back and the seat cushion from a front space side formed at a front portion of the seat back; and clamping a bottom portion of the seat back from its front portion and rear portion with respective front and rear articulating sections disposed in the clamping means.

The vehicle seat is clamped with the holding means by inserting the holding means into the gap formed between the seat back and the seat cushion and by holding the seat back at its three sites, i.e. its bottom portion, its lower front portion and its lower rear portion. This arrangement of the holding means can hold the vehicle seat with certain.

This arrangement allows the holding means to be inserted into the gap formed therebetween only from its front space formed ahead of the seat back and over the seat cushion. Hence, even if the vehicle body has a low roof or there is no large space in front of the seat cushion, the holding means can readily be removed or evacuated from the cabin of the vehicle body.

In order to achieve another object of this invention, the robot hand comprises a holding means arranged so as to be inserted into a gap formed between the seat back and the seat cushion, front and rear articulating means disposed in the holding means for pressing and clamping a lower end portion of the seat back from its front portion and rear portion, and a driving means for driving the front and rear articulating means.

Other objects, features and advantages of this invention will become apparent in the course of the description of the preferred embodiments, which follows, with reference to the accompanying drawings.

DESCRIPTION OF THE PREFERRED EMBODIMENTS

The present invention will be described in more detail by way of examples with reference to the accompanying drawings.

Figure 9:
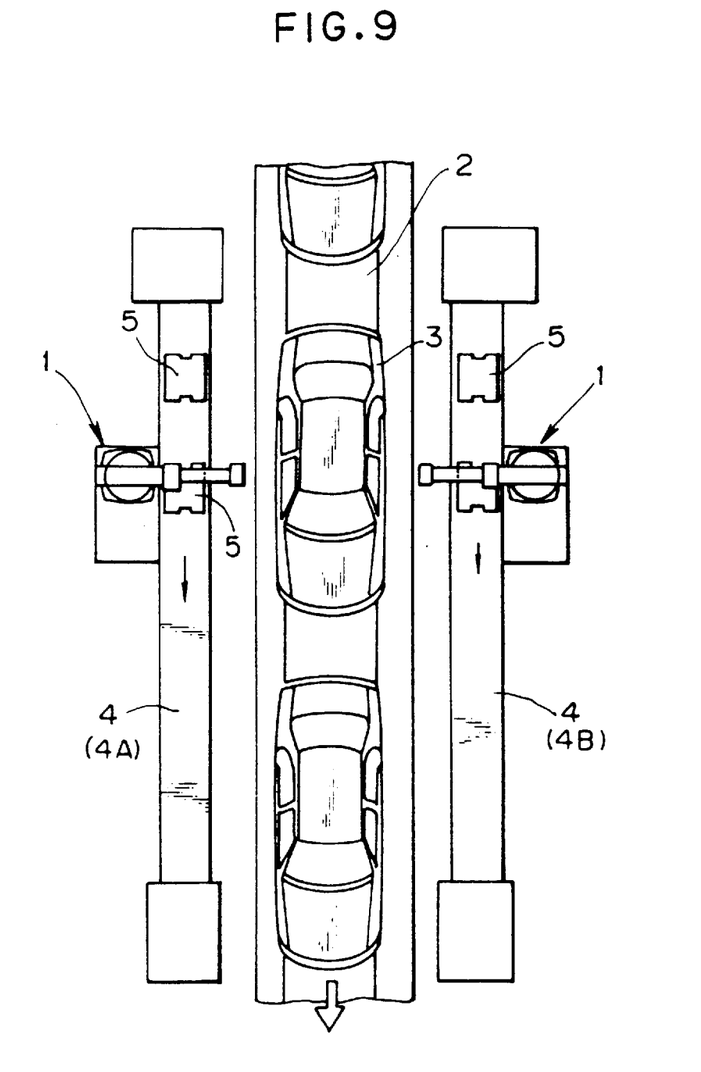
FIG. 9 is a plan view showing a vehicle bodies assembly line comprising a conveyor for carrying vehicle bodies, a conveyor for carrying vehicle seats, and robots.
Figure 10:
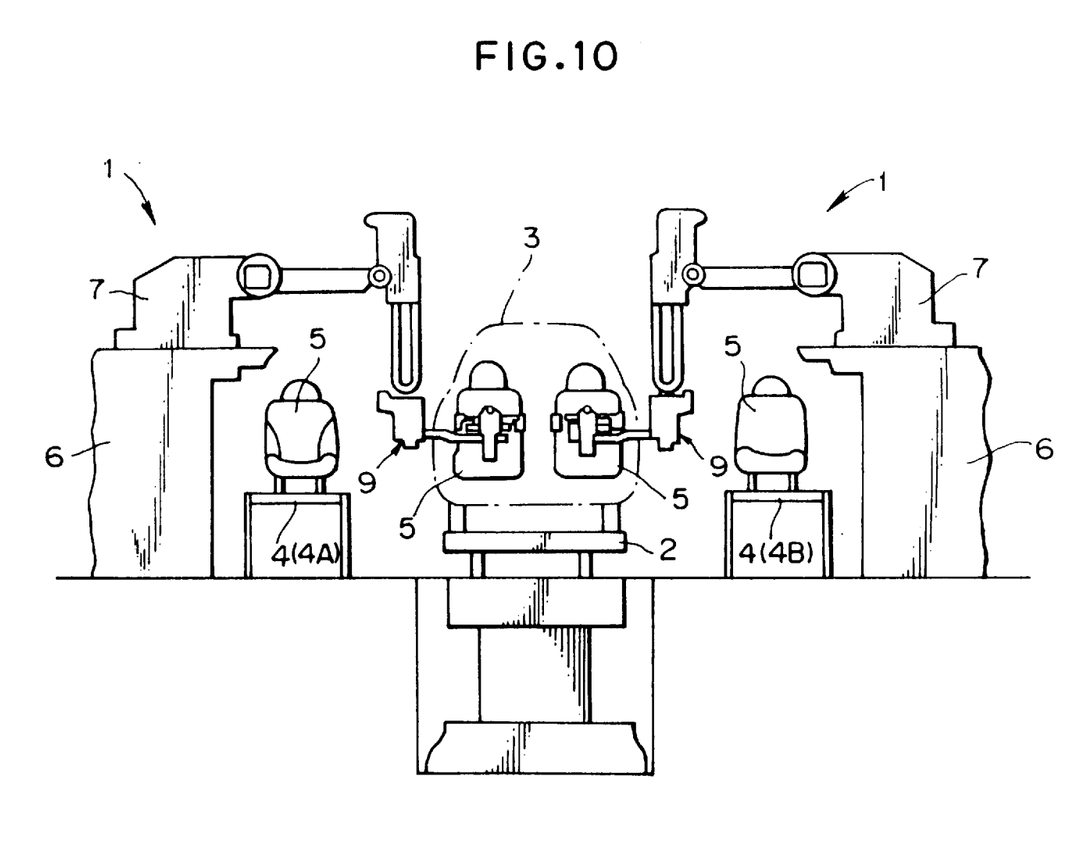
FIG. 10 is a front view showing the vehicle bodies assembly line comprising the conveyor for carrying vehicle bodies, the conveyor for carrying vehicle seats, and the robots.
Figure 11:
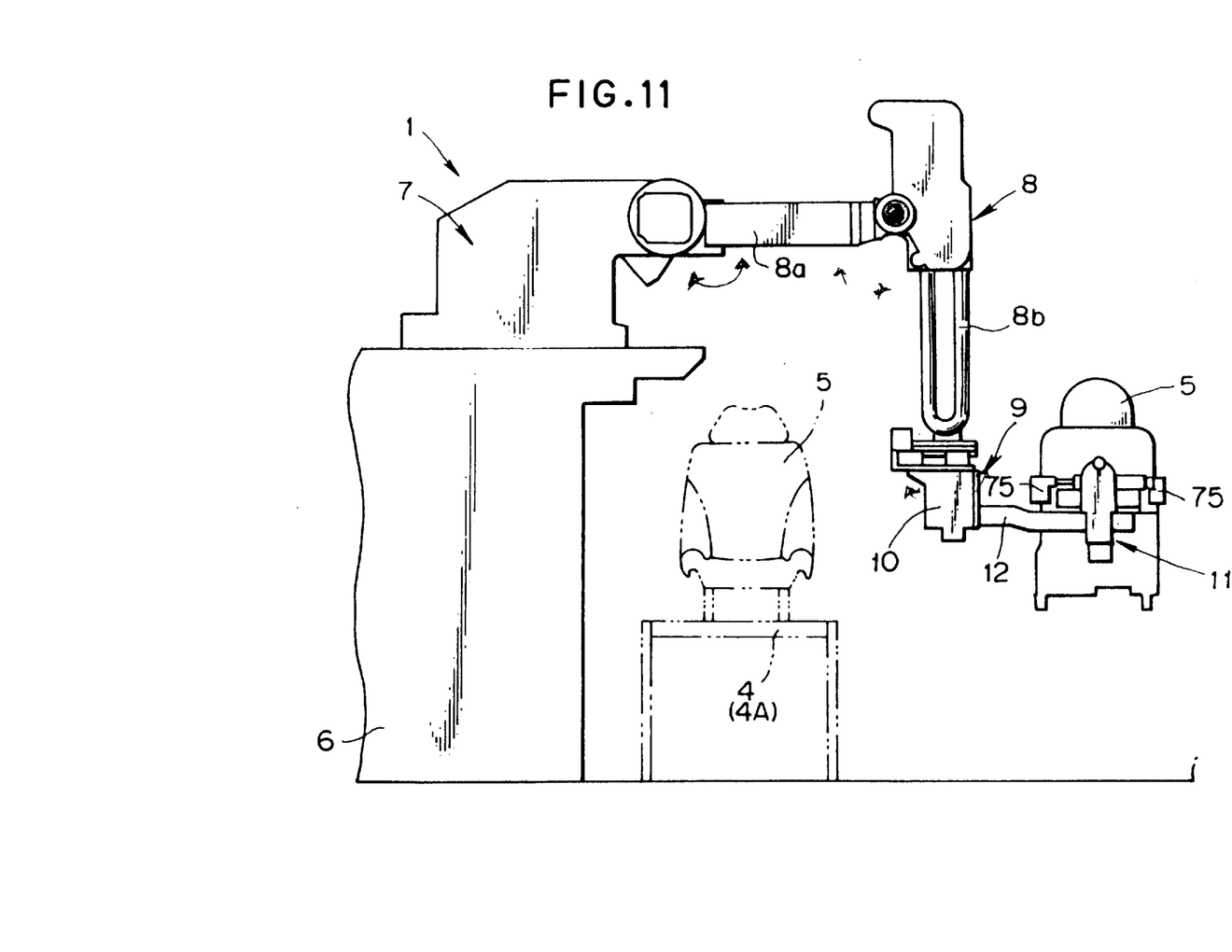
FIG. 11 is a front view showing an essential portion of FIG. 10.

As shown in FIGS. 9 to 11, the vehicle bodies assembly line comprises a robot 1, a vehicle bodies conveyor 2 for carrying vehicle bodies 3, and a seats conveyor 4 for carrying vehicle seats 5. The seats conveyor 4 is arranged for carrying front seats and disposed on both left and right sides of the vehicle bodies conveyor, one carrying front seats for drivers and the other carrying front seats for passengers seated next to the drivers.

The front seat 5 comprises a seat back 14 and a seat cushion 15 and it is carried with the seat back 14 extending vertically and the seat cushion 15 extending almost horizontally, i.e. it is carried in a state that it is loaded in the vehicle body 3 as it is. On the other hand, the vehicle body 3 is carried with its front surface directed forwards, i.e. directed in the direction in which the vehicle bodies conveyor 2 runs. Likewise, the vehicle seat 5 is carried with its front surface directed forwards, i.e. directed in the direction in which the seats conveyor 4 runs.

The robot 1 is arranged in a manner as will be described hereinafter, such that it clamps the vehicle seat 5 being carried through and on the seats conveyor 4 and it carries and holds the vehicle seat 5 in a predetermined position of the cabin of the vehicle body 3 being carried through and on the vehicle bodies conveyor 2. As the vehicle seat 5 is mounted at each of the left and right sides of the cabin of the vehicle body, the robot 1 is arranged on each of the left and right sides of the vehicle bodies conveyor 2, respectively. The robot 1 comprises a main body 7 mounted on a base 6 disposed outside each of the left and right seats conveyors 4, an arm extending from the main body 7, and a hand (robot hand) 9 mounted to a top of an arm 8. The arm 8 in turn comprises a base arm section 8a and an end arm section 8b, which are connected with each other so as to be pivotable vertically. The base arm section 8a is mounted to the main body 7 so as to be pivotable vertically, and the robot hand 9 is mounted to a top portion of the end arm section 8b. With this arrangement, the vehicle seat 5 is carried into the cabin of the vehicle body 3 by the pivotal movement of the arm sections 8a and 8b and the transferal of the robot hand 9.

The robot hand 9 comprises a reference position control unit 10, a holding unit 11 for holding and clamping the vehicle seat 5, and a connecting arm 12 for connecting the reference position control unit 10 with the holding unit 11.

Details of Reference Position Control Unit 10

A description will be made of the details of the reference position control unit 10 with reference to FIGS. 1 to 3.

The reference position control unit 10 is of a floating structure such that the holding unit 11 is connected through the connecting arm 12 to the end arm section 8b in a floating fashion or in a suspended state. In this embodiment, the reference position control unit 10 is arranged so as to be movable in three dimensions, i.e. in the longitudinal direction (in the direction as indicated by reference symbol "X—X" in the drawings), in the transverse direction (in the direction as indicated by reference symbol "Y—Y" in the drawings), and in the vertical direction (in the direction as indicated by reference symbol "Z—Z" in the drawings).

The reference position control unit 10 has a base 22 and a movable unit 25 disposed under the base 22. The base 22 is mounted to the end arm section 8b of the arm 8. At the bottom surface of the movable unit 25 are arranged left and right rails 21 extending in the transverse direction. Each of the rails 21 supports a guide 23 so as to be slidable in the transverse direction through and under the respective rail 21. At the upper surface of the movable unit 25 are arranged rails 24 extending in the longitudinal direction, and each of the rails 24 supports the guide 23 so as to be slidable in the longitudinal direction through and on the respective rail 24.

At a vertical wall 40 of the movable unit 25 on the side of the connecting arm 12 are arranged rails 27 extending in the vertical direction. On the other hand, at the side end portion of the vertical wall 40 is arranged a connecting plate 29, and a guide 28 supported integrally with the connecting plate 29 is further supported with the rail 27 so as to be slidable.

Each of the rails 21, 24 and 27 and each of the guides 23 and 28 support the connecting arm 12 and the holding unit 11 through the reference position control unit 10 in a suspended state so as to be movable in three dimensions, i.e. in the longitudinal direction, in the transverse direction and in the vertical direction, with respect to the end arm section 8b of the arm 8.

Cylinders are disposed for returning the connecting arm 12 to its predetermined reference positions with respect to the end arm section 8b. More specifically, a cylinder 30 is disposed for returning the connecting arm 12 to its predetermined longitudinal reference position with respect to the end arm section 8b; two cylinders 34 for returning it to its predetermined transverse reference position with respect thereto; and two cylinders 37 and 38 for returning it to its predetermined vertical reference position with respect thereto.

The cylinder 30 for returning the connecting arm 12 to its predetermined longitudinal reference position is mounted to a mounting 31 disposed on the upper surface of the base 22 and projecting upward therefrom. A tip of a rod 32 of the cylinder 30 is arranged capable of pressing a plate 33 projecting from an upper plate 26 of the movable unit 25. The state in which the plate 33 abuts with an opening edge (a stopper portion) 22a of the base 22 is referred to as the predetermined longitudinal reference position.

The two cylinders 34 for returning the connecting arm 12 to its transverse reference position are disposed coaxially on the upper plate 26 of the movable unit 25. Between respective rods 35 of the two cylinders 34 disposed in a longitudinally spaced relationship is arranged a plate 46 mounted to the bottom surface of the base 22. The state in which a pair of the rods 35 extended to a predetermined length clamp the plate 46 while pressing it vertically is referred to as the predetermined transverse reference position.

The cylinders 37 and 38 for returning the connecting arm 12 to its vertical reference position are disposed in a vertically spaced relationship. The cylinder 37 is mounted to the bottom surface of the upper plate 26, and the cylinder 38 is supported by a lower horizontal plate 39 of the movable unit 25. Between the rod 43 of the cylinder 37 and the rod 44 of the cylinder 38 is disposed a plate 41 extending from the connecting plate 29 integral with the connecting arm 12. The state in which a pair of the rods 43 and 44, each extended to its predetermined length, clamp the plate 41 while pressing it is referred to as the vertical reference position.

The connecting arm 12 with the holding unit 11 connected thereto is so considerably heavy that the holding unit 11 is provided with a large-size balance cylinder 36 for supporting the connecting arm 12 from bottom, in addition to the cylinders 37 and 38 for returning it to its vertical reference position. The balance cylinder 36 is mounted to the lower horizontal plate 39, and a rod 42 of the balance cylinder 36 is so arranged as to support the plate 41 from bottom.

Each of the cylinders 30, 34, 36, 37 and 38 may be comprised of a precision control cylinder.

Details of Holding Unit 11

The details of the holding unit 11 will now be described. The holding unit 11 comprises a holding section 50 to be inserted into a gap formed between the seat back 14 and the seat cushion 15, a clamping unit 13 for clamping the left and right end sides of the seat back 14, and a seat back supporting section 80 for supporting the front surface of the seat back 14 in a pressed state.

Holding Section 50

As shown in FIGS. 4 to 8, the holding section 50 is supported by a connecting plate 53 integral with the connecting arm 12. A base 54 is integral with the connecting plate 53 and left and has right projection plates 60 projecting therefrom. Each of the projection plates 60 is integral with an extension plate 64 and a front clamp claw 59 is pivotably mounted to each of the projection plates 60 through a shaft 61 extending in the longitudinal direction. To the extension plate 64 is pivotably mounted a rear clamp claw 63 through a shaft 65 extending in the transverse direction. Each of the front and rear clamp claws 59 and 63 is pivotably connected with each other through a shaft 62 extending in the transverse direction. The front and rear clamp claws 59 and 63 constitutes articulating sections.

Figure 5:
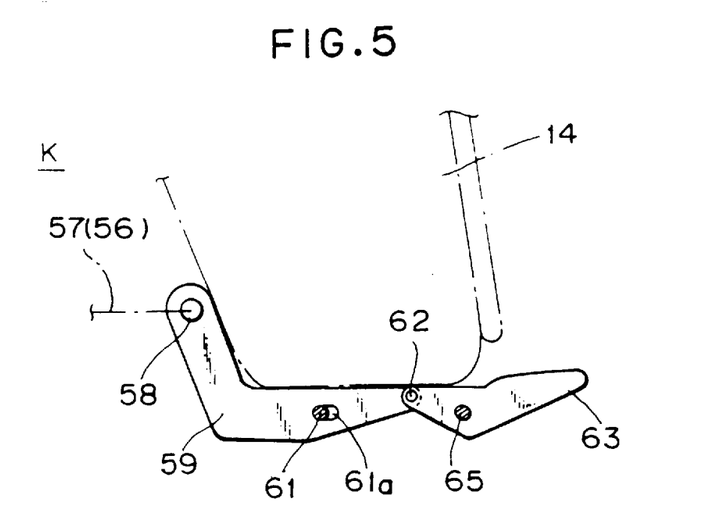
FIG. 5 is a view showing the state in which the articulating means disposed in the holding system is in a resting position.
Figure 6:
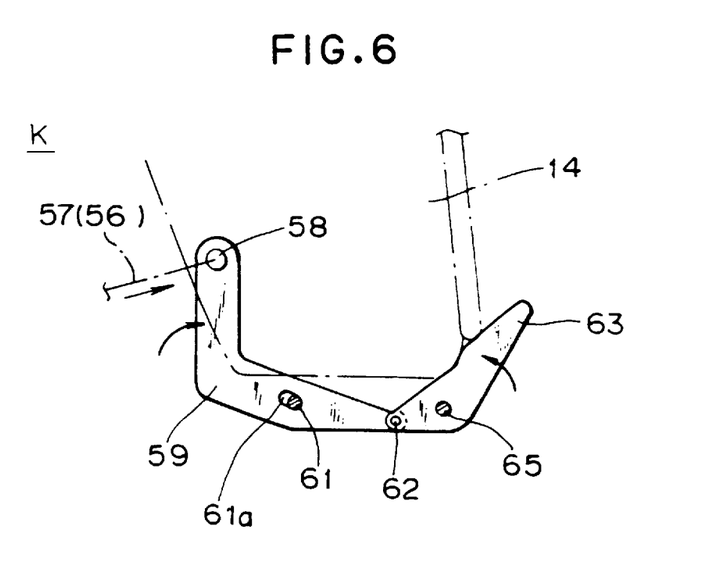
FIG. 6 is a view showing the state in which the articulating means disposed in the holding system is in an upright position.
Figure 7:
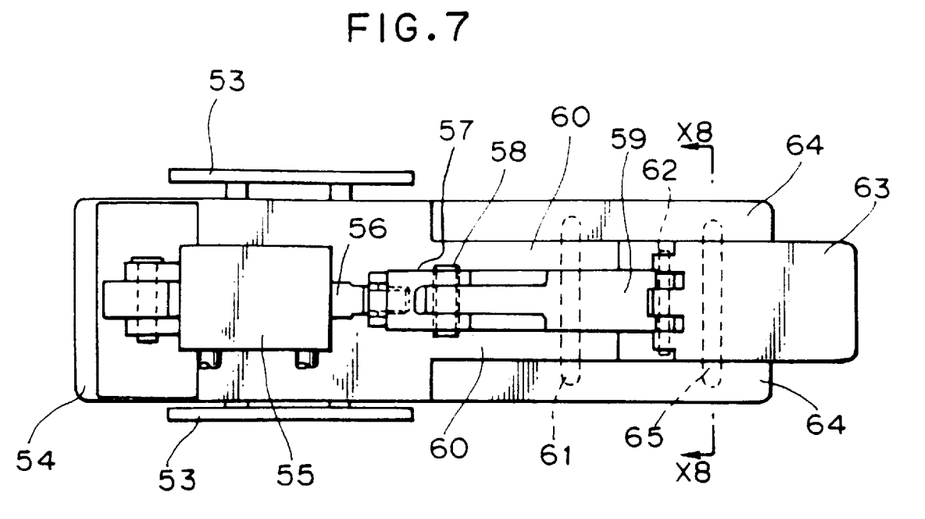
FIG. 7 is a plan view showing the holding system.
Figure 8:
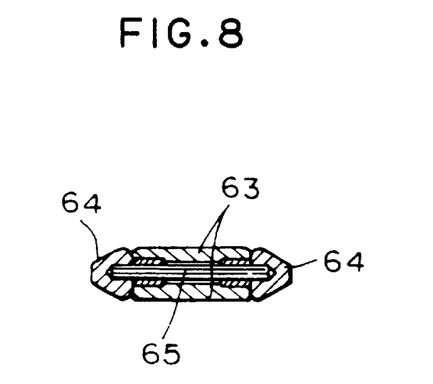
FIG. 8 is a cross-sectional view taken along line X8—X8 of FIG. 7.

The front clamp claw 59 is in a generally "<"-shaped form and it can assume a resting position, in association with the rear clamp claw 63, and an upright position. The front and rear clamp claws 59 and 63 in the resting position are of such a shape as extending generally straight from a half portion of the front clamp claw 59 to the rear clamp claw 63, as shown in FIG. 5, in order to allow an easy insertion of the front and rear clamp claws 59 and 63 into the gap formed between the seat back 14 and the seat cushion 15. On the other hand, as shown in FIG. 6, the front and rear clamp claws 59 and 63 in the upright position are of such a shape that each of their end portions on the sides opposite to the shaft 62 are turned upwards.

The front and rear clamp claws 59 and 63 in the upright position are arranged so as to clamp the bottom portion of the seat back 14 from and at its front and rear side ends, respectively. In the bottom portion of the seat back 14 is disposed frames 68 and 69, each extending in the transverse direction, i.e. each extending in the direction parallel to the width of the seat back 14, so as to withstand the external force imposed by the front and rear clamp claws 59 and 63. The front clamp claw 59 is provided with a generally rectangular hole 61a, extending horizontally, through which the shaft 61 is disposed and the hole 61a is so arranged as to absorb a variation in dimension between the resting position and the upright position of the front and rear clamp claws 59 and 63.

Figure 4:
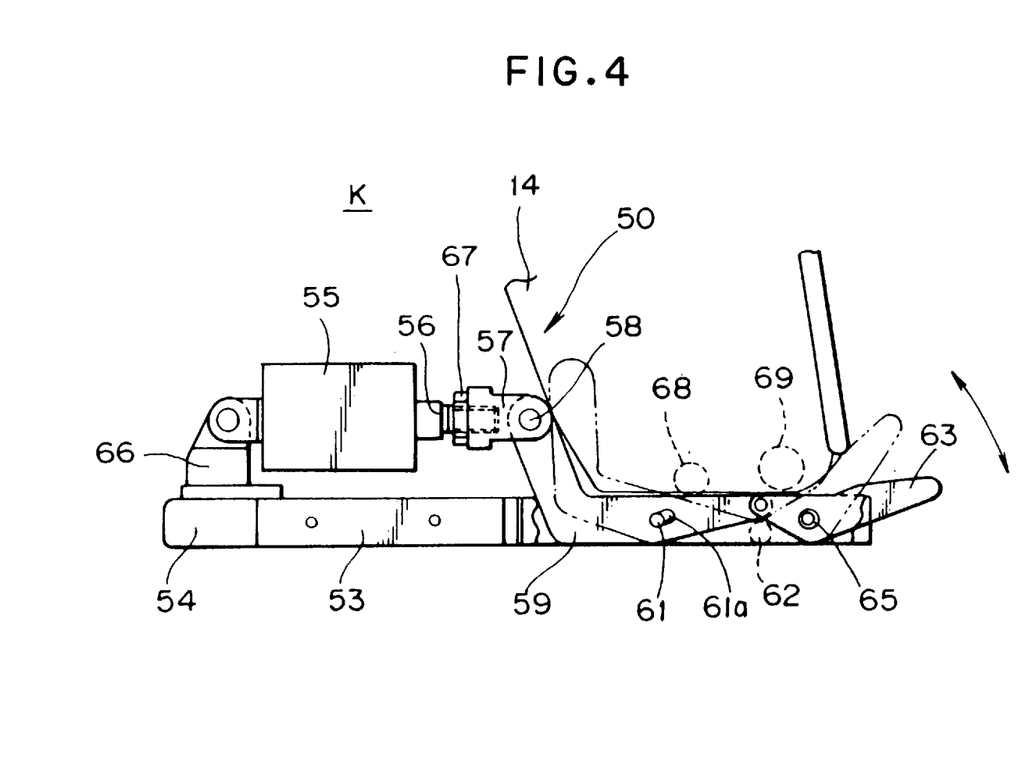
FIG. 4 is a side view showing an essential portion of a holding system for holding the lower end portion of the seat back.

As shown specifically in FIG. 4, the front and rear clamp claws 59 and 63 shift their positions between the resting position and the upright position by means of an air cylinder 55 mounted pivotably to the mounting plate 66 projecting from the base 54. A tip portion of a rod 56 of the air cylinder 55 is in mesh with a connecting member 57, and the rod 56 is secured to the connecting member 57 through a nut 67. The connecting member 57 is further connected pivotably to a front end portion of the front clamp claw 59 through a shaft 58 extending in the transverse direction. This arrangement allows the front clamp claw 59 to assume the resting position in association with the rear clamp claw 63, when the air cylinder 55 is contracted. On the other hand, it allows the front clamp claw 59 to assume the upright position in association with the rear clamp claw 63, when the air cylinder 55 is elongated.

Clamping Unit 13

The clamping unit 13 is disposed above the holding section 50. As shown in FIGS. 1 to 3, the clamping unit 13 comprises a clamping section 70 acting as a clamping means for clamping the left and right sides of the seat back 14, a seat back supporting section 80 for supporting the seat back 14 from its front, and upper and lower switch units 92 and 98, respectively, for detecting the depth of the insertion of the holding section 50 to the front surface of the seat back 14 through and in the gap formed between the seat back 14 and the seat cushion 15.

The clamping section 70 comprises a main body 71 consisting of a generally rectangular pipe, extending along or parallel to the front surface of the seat back 14, and the main body 71 is mounted to a plate 52 disposed at an upper end portions of the connecting pipes 53. The main body 71 is provided at its middle portion with a supporting shaft 72 projecting toward the seat back 14. To the supporting shaft 72 is mounted an intermediate portion of a cam ring 73 so as to be pivotable. On the other hand, to each of the end portions of the cam ring 73 is pivotably connected a ring 74 which in turn is pivotably connected to the left and right clamping plates 75, respectively.

Between the left and right clamping plates 75 is disposed an air cylinder 76 which in turn is connected at its one end to one of the left and right clamping plates 75 and at its other end to the other thereof. By contracting the air cylinder 76, the distance between the left and right clamping plates 75 becomes narrower. On the other hand, by elongating the air cylinder 76, the distance between the left and right clamping plates 75 becomes wider. As described hereinabove, the variation of the distance between the left and right clamping plates 75 is made by displacing the left and right clamping plates 75 symmetrically to the left and the right, respectively, by means of the cam ring 73. In other words, the left clamping plate 75 is displaced toward the right or the left, closer to the right clamping plate 75 or apart therefrom, while the right clamping plate 75 is displaced toward the left or the right in the same distance to or from the predetermined reference position as the left clamping plate 75, closer to the left clamping plate 75 or apart therefrom, concurrently and symmetrically with each other. The air cylinder 76 has a braking system which is operated in a state in which the seat back 14 is pressed and clamped at its both left and right sides with a predetermined magnitude of the pressing force with a pair of the left and right clamping plates 75, ensuring the clamping state in which the seat back 14 is clamped with the left and right clamping plates 75 with certainty.

The maximal distance between the left and right clamping plates 75 is set so as to be wider by a predetermined length than the transverse (between the left and the right) width of the seat back 14. The setting of the maximal distance between the left and right clamping plates 75 in the manner as described hereinabove allows the seat back 14 to be located and loaded in the right position between the left and right clamping plates 75, even if the vehicle seat 5 would be carried on the seats conveyor 4 in the position deviated to some extent to the left or to the right from its predetermined position. Then, the distance between the left and right clamping plates 75 is narrowed by displacing them symmetrically to the left and to the right, respectively, thereby clamping the seat back 14 from both of its left and right sides. In this case, the seat back 14 is clamped with the left and right clamping plates 75 in a state such that the left and right sides of the seat back 14 are aligned transversely with the clamping unit 13. Further, as the width between the left and right sides of the holding section 50 is set to be smaller than the width of the left and right sides of the seat back 14, the holding section 50 fails to obstruct the alignment of the left and right sides of the seat back 14 by the left and right clamping plates 75.

Then, a description will be made of the operations of the clamping section 70 and the reference position control unit 10 when the position of the vehicle seat 5 being carried on the seats conveyor 4 is deviated to some extent to the left or to the right.

A pair of the left and right clamping plates 75 is opened to their maximal distance before they clamp the seat back 14. When the seat back 14 being carried on the seats conveyor 4 is deviated, for example, by about 15 mm to the right from its predetermined reference position, the distance between the left and right clamping plates 75 is narrowed in order to clamp the seat back 14. In this case, both of the seat back 14 and the base 22 of the reference position control unit 10 do not move, the movable unit 25 of the reference position control unit 10 is allowed to be moved to the right after its locked state has been released, when the left and right clamping plates 75 clamp the seat back 14. The displacement to the right is returned to its reference position when the seat back 14 is lifted up. More specifically, as shown in FIG. 3, when the cylinders 34 disposed in the reference position control unit 10 are turned on, each of the rods 35 is extended forwards from its contracted position, thereby pressing the plate 46 mounted on the bottom surface of the base 22 and clamping the seat back 14. The movable unit 25 is then returned to its vertical reference position. As a consequence, the vehicle seat 5 is returned to its predetermined reference position.

Seat Back Supporting Section 80

The seat back supporting section 80 is so arranged so to prevent the seat back 14 from turning forwards by pressing and supporting the seat back 14 from the front at the time when the vehicle seat 5 is loaded into the cabin of the vehicle body 3. As the assembly of the seat back 14 and the seat cushion 15 has the gravitational center as a whole in the position ahead of the seat cushion 15 to a considerable extent, it is preferred to take the forward turning of the seat back 14 into account. In this respect, the seat back supporting section 80 is provided for the holding unit 11.

Figure 3:
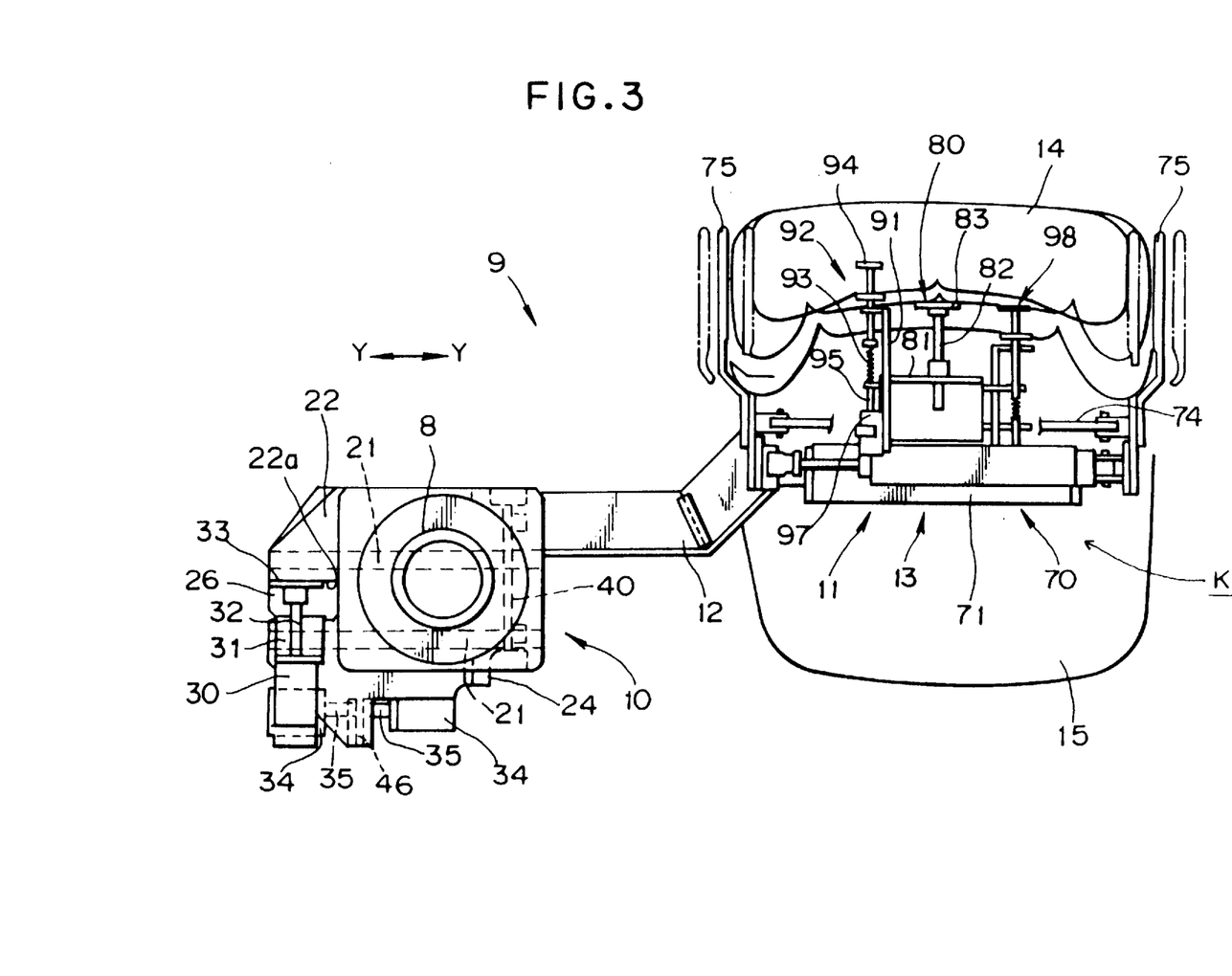
FIG. 3 is a plan view showing the state of FIG. 1 when looked from above.

As shown in FIG. 3, the seat back supporting section 80 is mounted to a top of a mounting plate 81 welded to the main body 71 and it comprises a rod 82 and a pad member 83 mounted to a top of the rod 82.

Upper & Lower Switch Units 92 & 98

Figure 1:
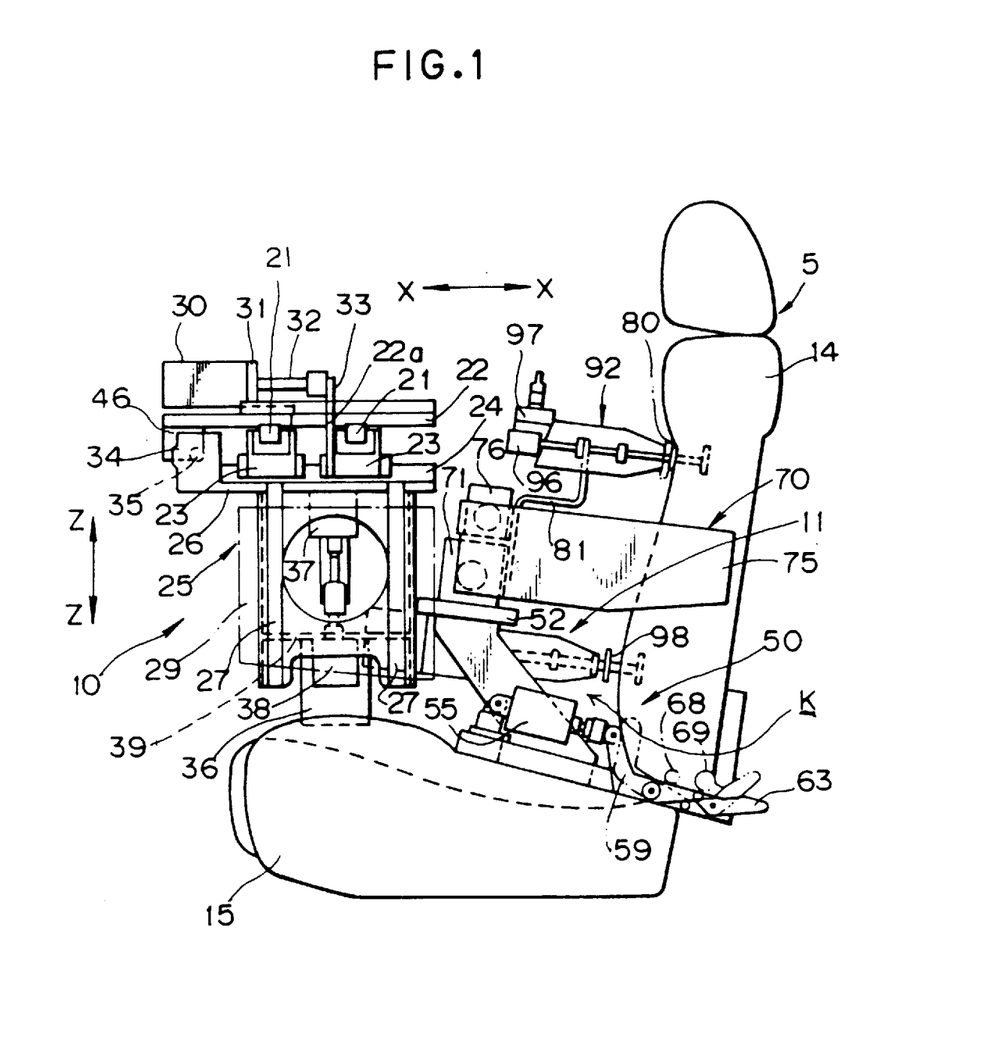
FIG. 1 is a side view showing the state in which a seat back is held with a robot hand according to an embodiment of this invention.
Figure 2:
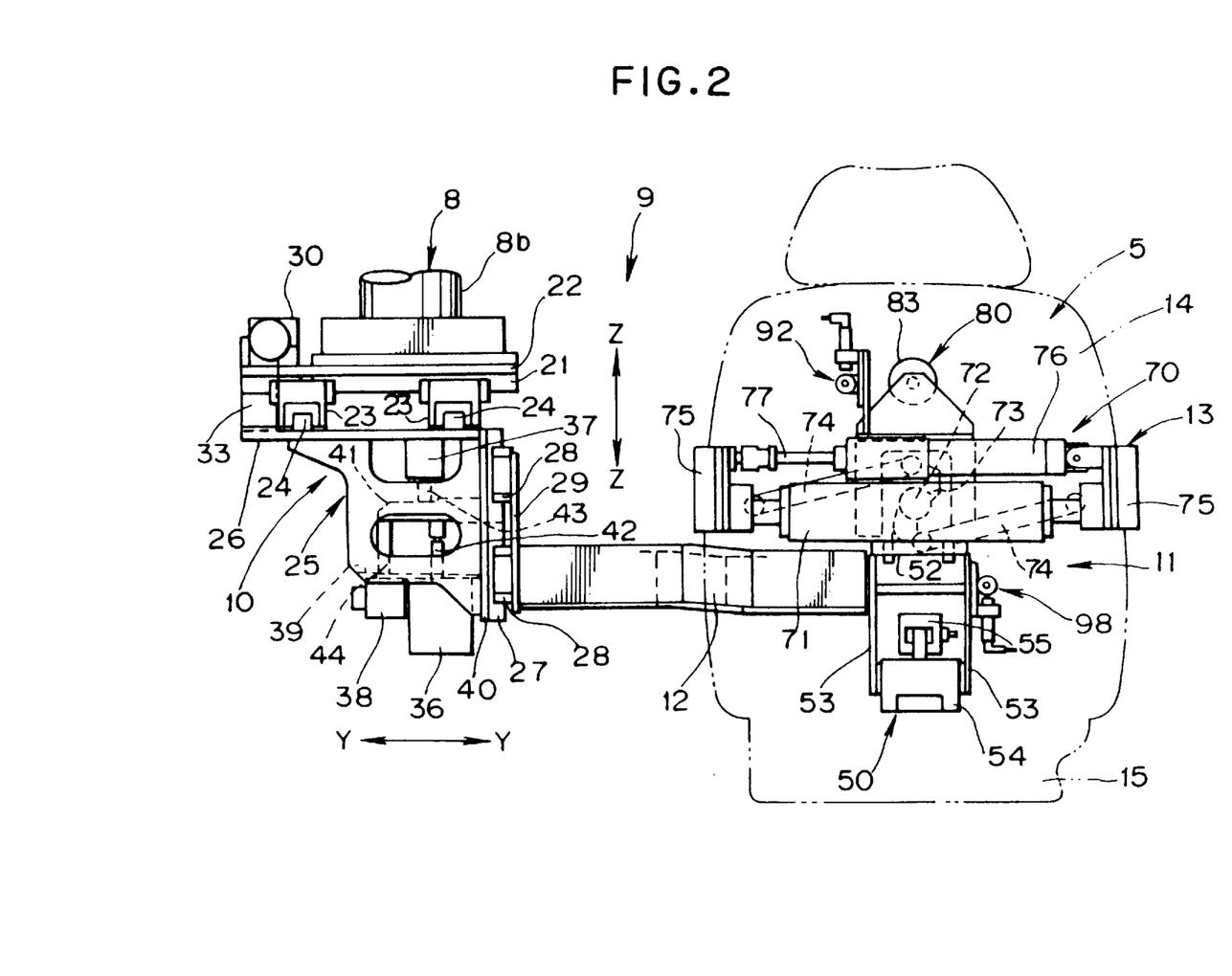
FIG. 2 is a front view showing the state of FIG. 1 when looked from left.

As shown in FIGS. 1 to 3, a mounting plate 91 is disposed standing upright from the mounting plate 81 and it is provided with the upper switch unit 92 which in turn comprises an abutment member 94 biased by a spring 93 toward a shaft 95, the shaft 95, a detecting section 96 disposed at an end portion of the shaft 95, and a detector 97 disposed in the vicinity of the detecting section 96. The upper switch unit 92 is normally in such a state as projecting to its longest distance because the abutment member 94 is biased by the spring 93 toward the seat back 14. As the holding section 50 is inserted into the gap between the seat back 14 and the seat cushion 15, the abutment member 94 is also pressed toward the seat back 14, thereby transferring the shaft 95 to the side opposite to the seat back 14 and then detecting the detecting section 96 by the detector 97, followed by turning the upper switch unit 92 on.

The lower switch unit 98 has substantially the same structure as the upper switch unit 92. When both of the upper switch unit 92 and the lower switch unit 98 are turned on, it is decided that the holding section 50 has been inserted into the gap therebetween to its predetermined position.

Actions of Robot Hand 1

A description will now be made of the actions and operations of the robot hand having the structure as described hereinabove.

As shown in FIG. 9, as the vehicle seat 5 is carried in the position next to the vehicle body 3, the arm 8 of the robot 1 pivots to place the holding unit 11 in a front space, as indicated by reference symbol "K", ahead of the seat back 15 and above the set cushion 15 of the vehicle seat 5 being carried on the seats conveyor 4. Then, the cylinder 30, the cylinders 37 and 38, the vehicle body 34 as well as the balance cylinder 36 for the reference position control unit 10 are brought into a state in which the pressure is decreased or the locked state is released, in order to cause no cylinder to work as resistance when the external force acts. Further, the air cylinder 55 and the air cylinder 76 for the holding unit 11 are likewise brought into a state in which the pressure is decreased or the locked state is released. In this state, a pair of the left and right clamping plates 75 widens its maximal distance therebetween.

Further, as shown in FIG. 1, the holding section 50 is inserted into the gap formed between the seat back 14 and the seat cushion 15 from the side of the front space K with the left and right clamping plates 75 widened to its largest length. The holding section 50 is inserted into the gap between the seat back 14 and the seat cushion 15 until the upper switch unit 92 and the lower switch unit 93 are both turned on. Once the insertion of the holding section 50 into the gap therebetween has been finished and the holding section 50 is brought into the state as shown in FIG. 5 and as indicated by solid line in FIG. 4, a solenoid of the air cylinder 55 is shifted to thereby elongate the air cylinder 55 and press the front clamp claw 59. This action allows the front clamp claw 59 and the rear clamp claw 63 to clamp the bottom portion of the seat back 14 from front and back (the state as shown in FIG. 6 and as indicated by two-dotted line in FIG. 4.

At this time, as shown in FIG. 2, the clamping section 70 of the holding unit 11 allows a pair of the left and right clamping plates 75 to tightly clamp the seat back 14 by elongating the air cylinder 76. The seat cushion 15 is allowed to move closer to the seat back 14 from the front space K in association with the operation for inserting the holding section 50 into the gap therebetween. By applying a predetermined magnitude of the pressure to the air cylinder 76, a pair of the left and right clamping plates 75 narrows its transverse width and tightly clamps the left and right side ends of the seat back 14 and then the seat back 14 is lifted up by increasing the pressure of each of the cylinders 30, 34, 36, 37 and 38 for the reference position control unit 10, and thereafter the movable unit 25 is locked. This action can return the vehicle seat 5 to its reference position even if the position of the vehicle seat 5 on the seats conveyor 4 is deviated, when the vehicle seat 5 is clamped by the clamping section 70.

In this state, the arm 8 is moved in a predetermined distance to thereby transfer the vehicle seat 5 up to a predetermined position within the cabin of the vehicle body 3. In many cases, recently, it is noted that the seat 5 is so large in size that it cannot be loaded through an opening of the vehicle body 3 in its horizontal state. In such a case, the seat 5 can be carried into the cabin of the vehicle body 3 in an inclined state in order to come into no contact with the opening edge through which the vehicle seat 5 is loaded.

After the vehicle seat 5 has been carried into the cabin of the vehicle body 3, the locking of the movable unit 25 is released and the vehicle seat 5 is secured in its predetermined positions in the cabin of the vehicle body 3. Once the vehicle seat 5 has been mounted to the vehicle body 3, a solenoid of each of the air cylinder 55 and the air cylinder 76 is shifted to thereby release the holding by the front clamp claw 59 and the rear clamp claw 63 as well as the clamping by the left and right clamping plates 75.

Thereafter, the holding unit 11 is removed and evacuated from the cabin of the vehicle body 3. The rear clamp claw 63 of the holding section 50 and the left and right clamping plates 75 of the clamping section 70 can be removed directly from the front portion of the seat back 14. In other words, the holding unit 11 is evacuated or removed merely from the front space K ahead of the seat back 14 and over the seat cushion 15. Hence, the holding section 50 and the clamping section 70 can be recovered from the cabin of the vehicle body 3 without coming into touch with the roof of the vehicle body 3 and any part located ahead of the seat cushion 15. After the holding unit 11 is evacuated outside the vehicle body 3, the movable unit 25 is brought again into its locked state and returned to its reference position for loading a seat 5 coming next.

As described hereinabove, the vehicle seat 5 can be tightly held at its three positions, i.e. in the bottom end of the seat back 14 and in the lower front and rear positions thereof, by the holding section 50 inserted into the gap formed between the seat back 14 and the seat cushion 15. Further, the holding section 50 can be transferred in the front space K ahead of the seat back 14 and over the seat cushion 15, so that this arrangement can readily be applied to vehicles having low roofs without coming into touch with the roofs or any other parts of the vehicle body 3.

In addition, the vehicle seat 5 can be tightly clamped by the clamping section 70 that clamps the left and right side ends of the vehicle seat 5, in association with the holding section 50. Like the holding section 50, the clamping section 70 can be transferred in the front space K for the seat back 14, i.e. in the space ahead of the seat back 14 and over the seat cushion 15, so that this arrangement can readily be applied to vehicles having no wide space ahead of the seat cushion 15.

Furthermore, the seat back 14 of the vehicle seat 5 is held with the seat back supporting section 80, thereby holding the vehicle seat 5 tightly. The seat back supporting section 80 is also transferred in the front space K ahead of the seat back 14 and over the seat cushion 15, so that it does not obstruct the loading of the vehicle seat 5 into the cabin of the vehicle body 3.

As a further embodiment of this invention, the holding unit 11 may be provided with the holding section 50 only, thereby making the overall structure compact in size.

What is claimed is:

1. A method for clamping a seat comprising a seat back and a seat cushion by means of a robot hand comprising:

inserting a clamp of said robot hand into a gap formed between said seat back and said seat cushion, said clamp being inserted from a front side of said seat back and over said seat cushion; and clamping a bottom portion of said seat back from the front side and from a rear side by moving respective front and rear articulating sections of said clamp;

wherein said seat back and said seat cushion are clamped with said robot hand by further clamping left and right sides of said seat back with left and right clamping means, respectively, disposed in said robot hand and arranged so as to come closer to said seat back from the front of said seat back.

2. The method as claimed in claim 1, wherein said seat back and said seat cushion are clamped with the robot hand by further pressing on a front surface of said seat back with front portion supporting means disposed in said robot hand before moving the respective front and rear sections.

3. A robot hand comprising:

a clamp arranged so as to be insertable into a gap formed between a seat back and a seat cushion that together comprise a seat and comprising front and rear articulating sections for clamping a bottom portion of said seat back from a front side of said seat back and from a rear side of said seat back; and driving means for driving said front and rear articulating sections; wherein:

said front and rear articulating sections have front and rear clamp claws, respectively, disposed pivotably to each other; and said driving means is operable to shift a position of each of said front and rear clamp claws between a resting position and an upright position, said upright position being a position in which a bottom portion of said seat back is clampable with said front and rear clamp claws and said resting position being a position in which said front and rear clamp claws are removable from said gap.

4. A robot hand comprising:

a clamp arranged so as to be insertable into a gap formed between a seat back and a seat cushion that together comprise a seat and comprising front and rear articulating sections for clamping a bottom portion of said seat back from a front side of said seat back and from a rear side of said seat back;

driving means for driving said front and rear articulating sections; and detecting means oriented relative to said clamp for detecting whether said clamp is inserted to a predetermined depth into said gap.

5. The robot hand as claimed in claim 3, further comprising loading means connected to said clamp and said driving means for loading said seat in a cabin of a vehicle body being carried on a conveyor line.

6. A robot system including a robot hand comprising a clamp arranged so as to be insertable into a gap formed between a seat back and a seat cushion that together comprise a seat, said clamp comprising front and rear articulating sections for clamping a bottom portion of said seat back from a front side of said seat back and from a rear side of said seat back, and driving means for driving said front and rear articulating sections, wherein said front and rear articulating sections have front and rear clamp claws, respectively, disposed pivotably to each other, and said driving means is operable to shift a position of each of said front and rear clamp claws between a resting position and an upright position, said upright position being a position in which a bottom portion of said seat back is clampable with said front and rear clamp claws and said resting position being a position in which said front and rear clamp claws are removable from said gap, the robot system further comprising connecting means for connecting a robot arm to the robot hand.

7. The robot system as claimed in claim 6, further comprising moving means connected to said connecting means for moving said robot hand in a longitudinal direction, in a transverse direction and in a vertical direction.

8. The robot system as claimed in claim 7, further comprising supporting means connected to said robot hand for supporting said robot hand from below said seat back.

9. The robot system as claimed in claim 7, further comprising means for returning said robot hand to a predetermined reference position, wherein said returning means is connected to said moving means.

10. A robot hand comprising:
   a clamp arranged so as to be insertable into a gap formed between a seat back and a seat cushion that together comprise a seat and comprising front and rear articulating sections for clamping a bottom portion of said seat back from a front side of said seat back and from a rear side of said seat back; and
   driving means for driving said front and rear articulating sections; further comprising left and right clamping means operable with said clamp for clamping said seat back from a left side and from a right side of said seat back.

11. The robot hand as claimed in claim 3, further comprising a front surface supporting means for pressing against a front surface of said seat back.

12. The robot hand as claimed in claim 10, wherein said left and right clamping means is positioned so that said clamp is insertable into the gap formed between the seat back and the seat cushion from the front side of the back seat.

13. A robot system including a robot hand comprising a clamp arranged so as to be insertable into a gap formed between a back seat cushion that together comprise a seat, said clamp comprising front and rear articulating sections for clamping a bottom portion of said seat back from a front side of said seat back and from a rear side of said seat back, driving means for driving said front and rear articulating section, and left and right clamping means operable with said clamp for clamping said seat back from a left side and from a right side of said seat back, wherein said left and right clamping means is positioned so that said clamp is insertable into the gap formed between the seat back and the seat cushion from the front side of the seat back, the robot system further comprising a robot arm connected to the robot hand by a floating system, the floating system comprising reference position returning means for returning the robot hand to a predetermined reference position, wherein:
   the left and right clamping means are connected with each other so as to be movable symmetrically to the left and right or to the right and the left, respectively;
   a maximal distance between the left and the right clamping means is longer by a predetermined length than a transverse width of the seat back;
   and the robot hand is connected to the robot arm and the floating system so as to be displacable to the left and the right by the floating system.

14. A method for clamping a seat comprised of a seat back and a seat cushion with a robot hand, said method comprising:
   inserting a clamp of the robot hand into a gap formed between the seat back and the seat cushion, the clamp being inserted from a front side of the seat back and over the seat cushion;
   clamping a bottom portion of the seat back from the front side and from a rear side by moving respective front and rear articulating sections of the clamp; and
   clamping the seat back and the seat cushion with the robot hand by further clamping left and right side ends of the seat back with left and right clamping means, respectively, disposed in the robot hand and arranged so as to come closer to the seat back from the front of the seat back.

15. The method as claimed in claim 14, further comprising clamping the seat back and the seat cushion with the robot hand by further pressing on the front side of the seat back with front portion supporting means disposed in the robot hand before moving the respective front and rear sections.

16. The method as claimed in claim 14, further comprising:
   providing a floating system for connecting a robot arm to the robot hand, the floating system comprising reference position returning means for returning the robot hand to a predetermined reference position;
   said seat back and seat cushion clamping step further clamping the left side and the right side of the seat back so as to place the seat in a standard position; and
   floating the seat in a forward or rearward direction, in a left or right direction, or in an upward or downward direction.

17. The method as claimed in claim 16, further comprising disposing the seat within a chamber of an automobile by moving the seat in a vertical direction and/or in a horizontal direction along a conveyor.

18. A method for clamping a seat comprised of a seat back and a seat cushion with a robot hand, said method comprising:
   inserting a support member into a gap formed between the seat back and the seat cushion to support the seat; and
   clamping left and right sides of the seat back with a clamp approachable from a front side of the seat back.

19. The method as claimed in claim 18, further comprising:
   providing a floating system for connecting a robot arm to the robot hand, the floating system comprising reference position returning means for returning the robot hand to a predetermined reference position;
   said clamping step further clamping the left side and the right side of the seat back so as to place the seat in a standard position; and
   floating the seat in a forward or rearward direction, in a left or right direction, or in an upward or downward direction.

20. The method as claimed in claim 19, further comprising disposing the seat within a chamber of an automobile by moving the seat in a vertical direction and/or in a horizontal direction along a conveyor.

* * * * *